United States Patent
Cook

(10) Patent No.: US 6,536,497 B2
(45) Date of Patent: Mar. 25, 2003

(54) LAMINATING SYSTEM

(75) Inventor: Roy P. Cook, Temecula, CA (US)

(73) Assignee: Banner American Products, Inc., Temecula, CA (US)

(*) Notice: Subject to any disclaimer, the term of this patent is extended or adjusted under 35 U.S.C. 154(b) by 107 days.

(21) Appl. No.: 09/837,096

(22) Filed: Apr. 18, 2001

(65) Prior Publication Data

US 2002/0153093 A1 Oct. 24, 2002

(51) Int. Cl.[7] .............. B65B 9/40; B26D 5/00; B32B 31/18; F16M 11/20; B65H 7/00
(52) U.S. Cl. .............. 156/362; 156/355; 156/364; 156/379.8; 156/510; 156/552; 271/8.1; 271/110; 248/639; 108/153.1
(58) Field of Search .............. 156/355, 362, 156/364, 379.8, 383, 510, 523, 552; 271/8.1, 10.1, 110, 111; 248/639; 108/153.1

(56) References Cited

U.S. PATENT DOCUMENTS 3,607,533 A * 9/1971 Moore .................. 156/259
3,947,016 A * 3/1976 Horung et al. .......... 271/12
4,505,772 A * 3/1985 Renz .................... 156/355

* cited by examiner

Primary Examiner—J. A. Lorengo
(74) Attorney, Agent, or Firm—Loyal McKinley Hanson

(57) ABSTRACT

A laminating system includes a feeder apparatus, a laminating apparatus, and a trimmer apparatus mounted on a movable support structure that is adapted to maintain alignment in order to enable a user to move the system without upsetting the alignment. Simultaneous and differential speed control components for the feeder apparatus and the laminating apparatus are provided according to a separate aspect of the invention to enable the user to control spacing between individual sheets as they move along a feed path to the laminating apparatus. A guide plate provided on the feeder apparatus according to another aspect of the invention has an upwardly extending surface that faces the leading edges of sheets in a stack of sheets. An upper portion of that surface protrudes slightly toward the stack of sheets so that as the stack of sheets is raised, the leading edges of uppermost sheets in the stack of sheets bear against the upper portion of the guide plate to thereby help position the leading edges of the uppermost sheets perpendicular to the feed path so that they feed squarely into the laminating apparatus.

7 Claims, 6 Drawing Sheets

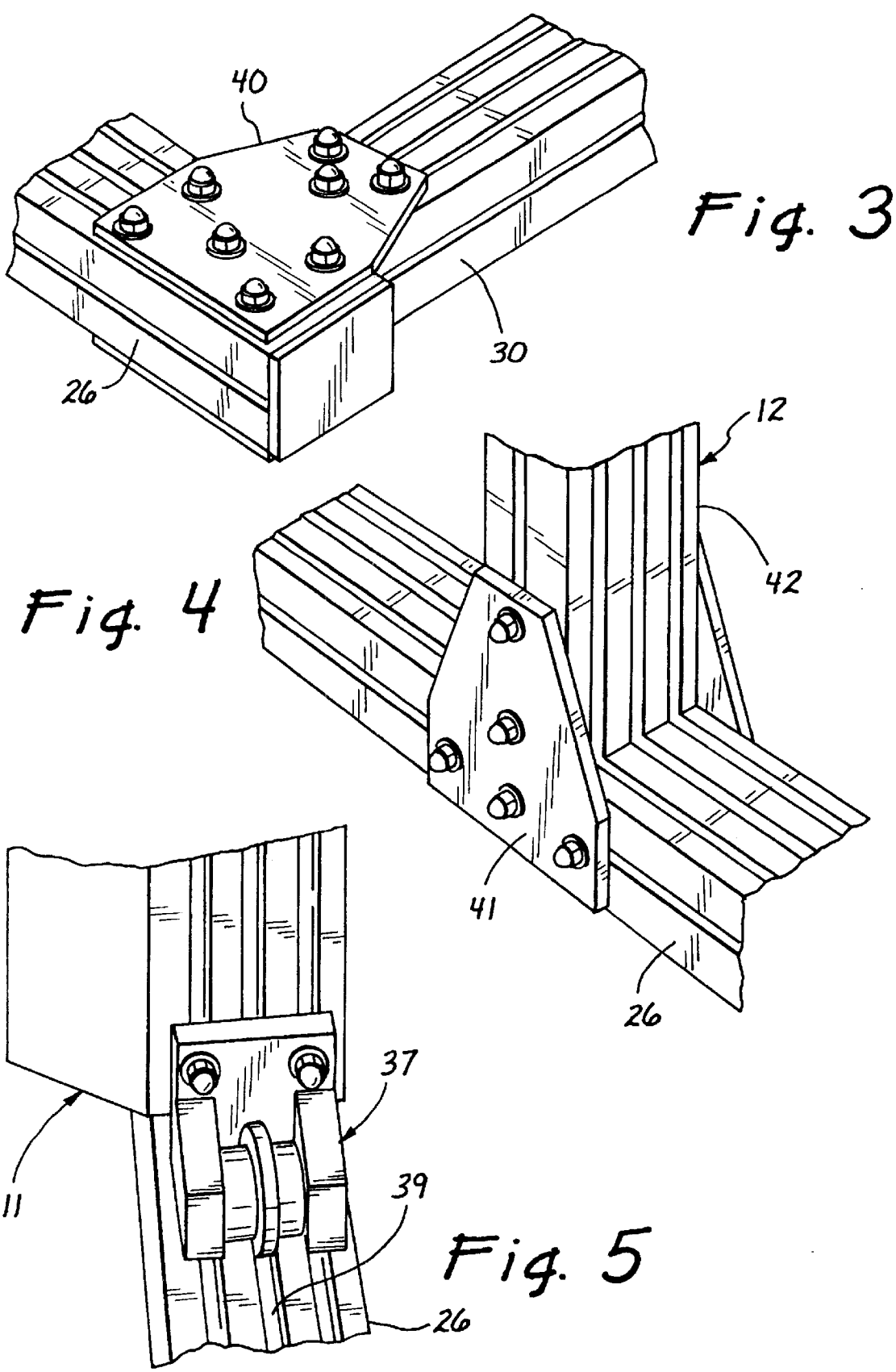

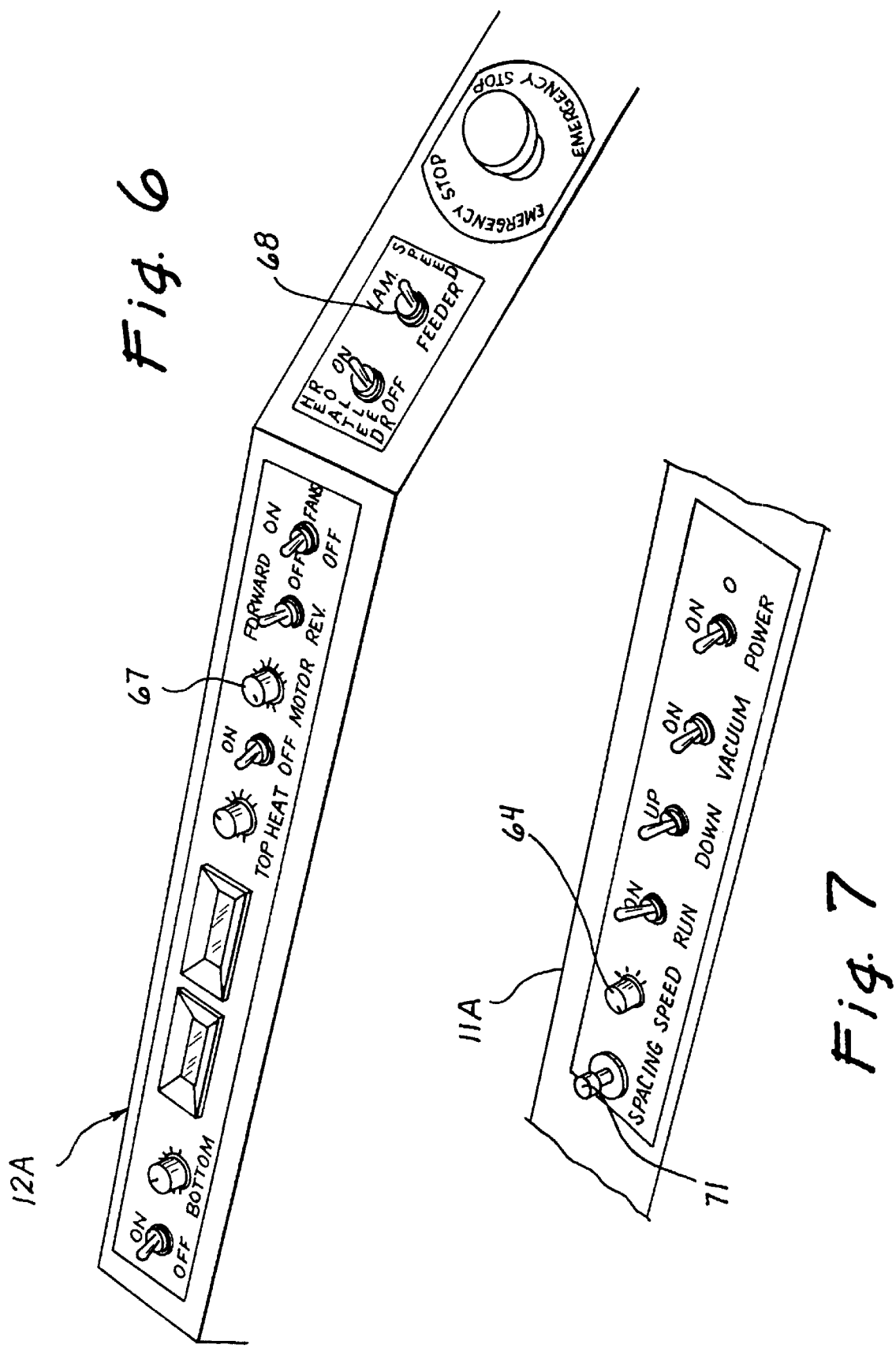

LAMINATING SYSTEM

BACKGROUND OF THE INVENTION

1. Technical Field

This invention relates generally to equipment for laminating sheets of paper, documents, cookbooks, menus, safety notices, and the like, and more particularly to a laminating system with automatic capabilities for the volume laminating requirements of many users, including those of on-demand book publishers, in-plant printers, and service bureaus.

2. Description of Related Art

A typical automated laminating system includes three stand-alone components, a feeder, a laminator, and a trimmer, that the user positions next to each other and carefully aligns for cooperative operation. The feeder feeds a stream of individual sheets to an input of the laminator; the laminator receives the individual sheets, laminates them with a continuous length of laminating film, and then outputs a continuous length of laminated sheets; the trimmer trims the output into individual laminated sheets. This technology is well known and the components of a laminating system are commercially available from various sources, including the FINISHER 2700 laminating machine available from Banner American Products, Inc. of Temecula, Calif.

One problem with existing laminating systems relates to component alignment. To align the feeder, the laminator, and the trimmer for proper operation, the user positions the three stand-alone components relative to each to satisfy several criteria. First, the feeder, the laminator, and the trimmer must all be aligned with a common longitudinal axis along which the sheets will move (i.e., the feed path). Second, the feeder must be properly spaced from an input side of the laminator for proper feeding of sheets to the laminator. Third, the feeder must be square with respect to the laminator so that the leading edge of the sheets are perpendicular to the feed path. Fourth, the trimmer must be properly spaced from an output side of the of the laminator for proper feeding from the laminator to the trimmer. Fifth, the trimmer must be square with respect to the laminator so that trimming is parallel to the leading and trailing edges of the sheets.

One inadvertent bump or push of any one component during operation can significantly upset this alignment. Relocation of system components to another shop location and movement to a storage location when not in use also upsets this alignment. In each case, time, effort, and skill is required to realign the components for operation. Thus, users need some way to overcome this concern.

Another problem concerns the need to feed the sheets squarely to the laminator so that their leading edges are perpendicular to the feed path. The feeder typically includes a tray that holds a stack of sheets from which sheets are fed on-by-one to the laminator. The leading edges of the sheets are disposed toward the laminator, but seldom are all sheets in a stack of sheets perfectly square as desired to insure that all leading edges are perpendicular to the feed path. Usually some sheets in a stack of sheets are slightly out of alignment with the other sheets. Thus, there is a need to better align the sheets in the stack in order to facilitate feeding.

Yet another problem concerns spacing between the trailing edge of a sheet being fed to the laminator and the leading edge of the following sheet. It is often desirable to vary spacing according to the laminating job because the trimmer is usually set so that it trims up to the edges of each sheet for single-sided lamination while leaving a margin for double-sided lamination. In addition, it is important to be able to keep minimum spacing between sheets in order to avoid adhesive buildup on rollers in the laminator that occurs from the laminating film contacting the rollers at each space between the trailing edge of one sheet and the leading edge of the next sheet. Existing laminating systems are lacking in this respect, some using relative complicated sensor techniques, and so users need a better way to control spacing between sheets.

SUMMARY OF THE INVENTION

This invention addresses the concerns outlined above by providing a laminating system with an alignment retention structure. The laminating system includes a feeder, a laminator, and a trimmer mounted. It also includes a movable support structure adapted to support and hold the other components in alignment with each other.

Thus, an inadvertent bump or push is not of the usual concern. Relocation of system components to another shop location or storage location when not in use is a simpler task requiring less time, effort, and skill.

One embodiment includes much more. Simultaneous and differential speed control components for the feeder and the laminator enable a user to control spacing between individual sheets as they are received by the laminating apparatus. In addition, the feeder has a guide plate that helps position the leading edges of sheets perpendicular to the feed path.

To paraphrase some of the more precise claim language, a laminating system constructed according to the invention includes a feeder apparatus, a laminating apparatus, and a trimmer apparatus on a movable support structure. The feeder apparatus is adapted to hold a stack of sheets and to feed individual sheets from the stack of sheets to the laminating apparatus. The laminating apparatus is adapted to receive and laminate the individual sheets with a continuous length of laminating film to form a continuous length of laminated sheets. The trimmer apparatus is adapted to receive and trim the continuous length of laminated sheets to form individual laminated sheets.

The movable support structure is adapted to retain the feeder apparatus, the laminating apparatus, and the trimmer apparatus in alignment with each other for cooperative operation as a laminating system. It does so while enabling a user to move the support structure, the sheet feeder apparatus, the laminating apparatus, and the trimmer apparatus together without upsetting the alignment. Preferably, the movable support structure includes casters that rest on the shop floor or other horizontal surface, and the feeder apparatus is mounted on the movable support structure to enable movement of the feeder apparatus toward and away from the laminating apparatus to facilitate replacement of laminating film in the laminating apparatus.

According to another aspect of the invention, there is provided simultaneous and differential speed control. The feeder apparatus has a first motor adapted to power movement of the sheets to the laminating apparatus, and the laminating apparatus has a second motor adapted to power movement the sheets through the laminating apparatus. Simultaneous speed control means enables the user to vary the speed of the first motor and the speed of the second motor simultaneously by the operation of a simultaneous speed control operator input device. Differential speed control means enable the operator to control the difference between the speed of the first motor and the speed of the second motor in order by the operation of a differential speed control operator input device in order to thereby control the spacing between individual sheets as the sheets are received at the input of the laminating apparatus.

According to yet another aspect of the invention, there is provided means in the feeder apparatus for squaring the leading edges of individual sheets with a feed path leading to the laminating apparatus. The sheet feeder apparatus includes (i) a tray adapted to support a stack of sheets so that a leading edge of each sheet in the stack of sheets is disposed toward the laminating apparatus, (ii) a motor-driven rotating vacuum sheet feeder assembly adapted to lift individual sheets one at a time from a top of the stack of sheets and to feed the individual sheets one at a time to a feed path leading to the laminating apparatus, (iii) means for automatically raising the tray as individual sheets are fed to the feed path in order to raise the stack of sheets and thereby continuously supply sheets to the motor-driven rotating vacuum sheet feeder assembly, and (iv) a guide plate disposed alongside the leading edges of the sheets in the stack of sheets.

The guide plate has an upwardly extending surface that faces the leading edges of the sheets in the stack of sheets. The upwardly extending surface extends horizontally perpendicular to the feed path, and the upwardly extending surface includes an upper portion that protrudes slightly toward the stack of sheets. As tray raises the stack of sheets, the leading edges of uppermost sheets in the stack of sheets bear against the upper portion of the guide plate to thereby position the leading edges of the uppermost sheets perpendicular to the feed path.

Thus, the laminating system of this invention significantly facilitates automated lamination. The components are kept aligned so that an inadvertent bump or push and relocation of system components to another shop location or storage location does not upset alignment. The user's ability to maintaining desired spacing between laminated sheets is improved, and the leading edges of individual sheets are kept square with the feed path, the laminator, and the trimmer. The following illustrative drawings and detailed description make the foregoing and other objects, features, and advantages of the invention more apparent.

BRIEF DESCRIPTION OF THE DRAWINGS

FIG. 3 is an enlarged isometric view of a corner portion of the movable support structure that is identified in FIG. 1 by line 3;

FIG. 4 is an enlarged isometric view of a vertical member of the movable support structure that is identified in FIG. 1 by line 4;

FIG. 5 is an enlarged isometric view of a wheel on the trimmer on a track in the movable support structure that is identified in FIG. 1 by line 5;

FIG. 6 is an enlarged view of the laminator control panel;

FIG. 7 is an enlarged view of the feeder control panel;

DESCRIPTION OF THE PREFERRED EMBODIMENTS

Figure 1:
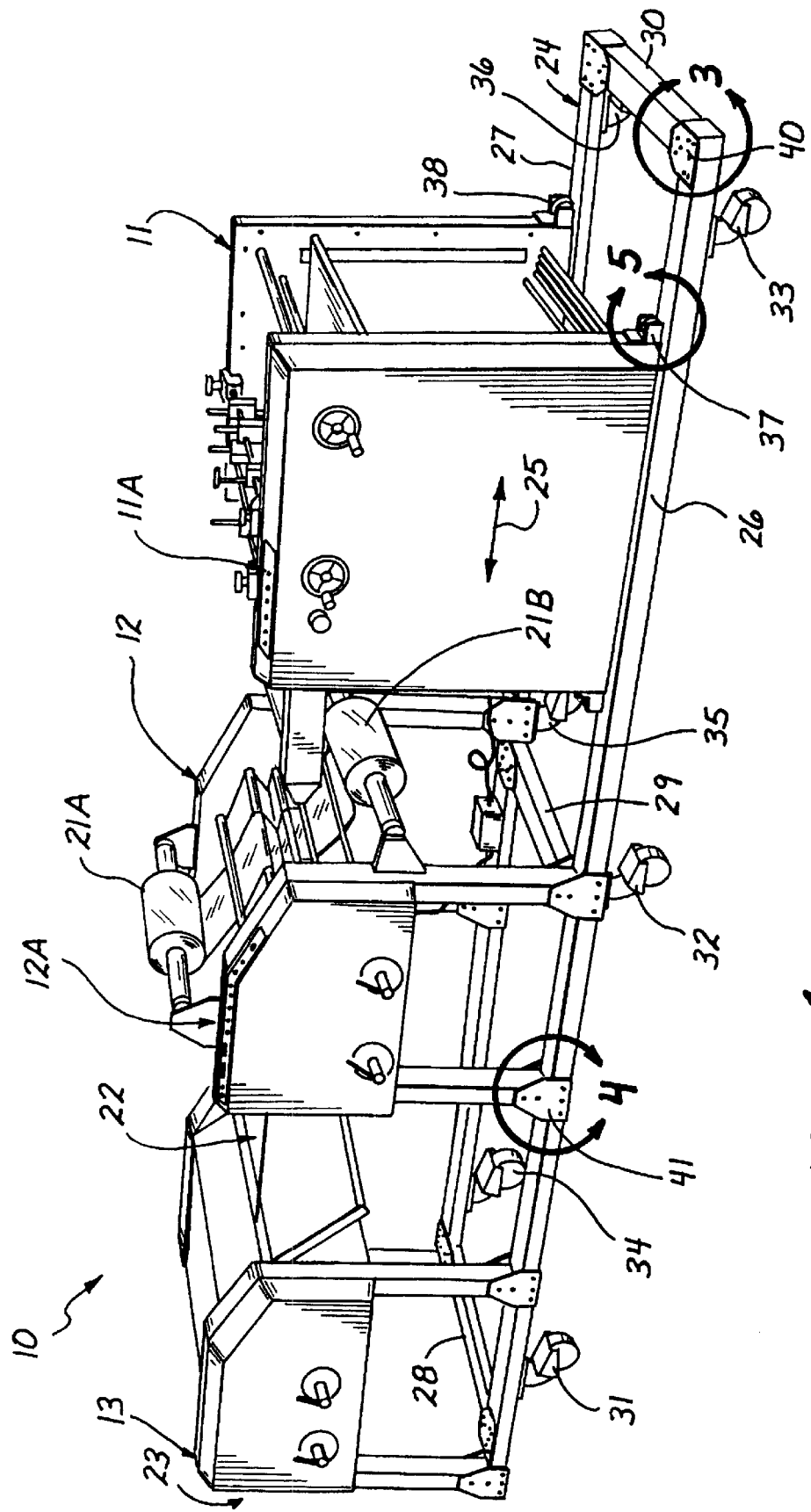
FIG. 1 of the drawings is an isometric view of a laminating system constructed according to the invention, showing a feeder, a laminator, and trimmer on a movable support structure.

FIGS. 1–9 of the drawings show various aspects of a laminating system 10 constructed according to the invention. Generally, the laminating system 10 includes a feeder 11, a laminator 12, and a trimmer 13. These components may be similar in some respects to existing stand-alone laminating components. They are adapted to operate cooperatively to laminate sheets; and cooperate to laminate sheets.

The feeder 11 (a sheet feeder apparatus) is adapted to hold a stack of sheets 14 (FIG. 9) and to feed individual sheets (FIG. 2) from the stack of sheets 14 along a feed path to the laminator 12. Four of the individual sheets are designated in FIG. 2 by reference numerals 15, 16, 17, and 18. They represent 8.5" by 11" letter size sheets, although the feeder 11 accommodates larger sheets also. The feed path is depicted by an arrow 19 in FIG. 2 and an arrow 20 in FIG. 8.

The laminator 12 (a sheet laminating apparatus) is adapted to receive and laminate the individual sheets 15–18 with a continuous length of laminating film 21A (FIGS. 1 and 2) to form a continuous length of laminated sheets 22 (FIG. 1). The laminator 12 operates in a known way to cover one side of each of the individual sheets 15–18 (an upper side) with the continuous length of laminating film 21. The laminator 12 operates in a known way for two-sided lamination to cover the opposite side of each sheet (a lower side) with a second continuous length of laminating film 21B to form the continuous length of laminated sheets 22.

The trimmer 13 (a trimmer apparatus) is adapted to receive and trim the continuous length of laminated sheets 22. The trimmer 13 forms individual laminated sheets that way that are discharge to a stack of laminated sheets at an output side 23 of the trimmer 13 (FIG. 1). Individual laminated sheets are not visible in the drawings, but they are simply the individual sheets 15 with a piece of the continuous length of laminating film 21A covering just one side of each sheet in the case of one-sided lamination, and with a piece of the second continuous length of laminating film 21B covering the opposite side in the case of two-sided lamination.

According to a first aspect of the invention, the laminating system 10 includes a movable support structure 24 (FIG. 1) that is adapted to retain the feeder 11, the laminator 12, and the trimmer 13 in alignment with each other for cooperative operation as a laminating system while enabling a user to manually move the support structure 24, the feeder 11, the laminator 12, and the trimmer 13 together to various desired locations without upsetting the alignment. The alignment satisfies various criteria. First, the feeder 11, the laminator 12, and the trimmer 13 are aligned with a common longitudinal axis along which the individual sheets 15–18 will move (i.e., the feed path depicted by the arrow 19 in FIG. 2 and the arrow 20 in FIG. 8). Second, the feeder 11 is properly spaced from the laminator 12 for proper feeding of individual sheets to the laminator 12. Third, the feeder 11 must be square with respect to the laminator 12 so that the leading edge of the sheets are perpendicular to the feed path. Fourth, the trimmer 13 must be properly spaced from the laminator 12 for proper feeding from the laminator 12 to the trimmer 13. Fifth, the trimmer 13 must be square with respect to the laminator 12 so that trimming is parallel to the leading and trailing edges of the sheets 15–18. Preferably, the feeder 11 is so mounted on the movable support structure 24 as to enable movement of the feeder 11 toward and away from the laminator 12 as depicted by an arrow 25 in FIG. 1 in order to thereby enable user access to the second continuous length of laminating film 21 B (i.e., a roll of film) for replacement purposes.

The illustrated movable support structure 24 achieves the foregoing with first and second elongated members 26 and 27 (FIG. 1) upon which the feeder 11, the laminator 12, and the trimmer 13 are mounted. The first and second elongated members 26 and 27 extend horizontally in parallel relationship to each other and to the feed path depicted by the arrow 19 in FIG. 2 and the arrow 20 in FIG. 8. A plurality of brace members 28, 29, and 30 extend horizontally between the first and second elongated members 26 and 27 in order to maintain them in fixed parallel relationship to each other. A plurality of casters 31 through 36 are provided on the support structure 24 to support it moveably in order to enable the user to move the entire laminating system 10 as a unit without upsetting alignment of the feeder 11, the laminating 12, and the trimmer 13. The user simply pushes against any of the components to move the entire laminating system 10.

The feeder 11 includes a plurality of wheel assemblies, just the wheel assemblies 37 and 38 being visible in FIG. 1. The wheel assemblies ride within respective ones of channels in the first and second elongated members 26 and 27 to enable the user to manually move the feeder 11 toward and away from the laminator 12 as depicted by the arrow 25 in FIG. 1. One such channel 39 in which the wheel assembly 37 rides is illustrated in FIG. 5 for the first elongated member 26. A suitable locking device (not shown) may be provided to hold the feeder 11 in a selected position. The user unlocks the locking device, moves the feeder 11 relative to the laminator 12, and then locks the locking device.

As a further idea of size, the feeder 11 extends from the movable support structure 24 to a height of about four feet above the floor or other horizontal surface upon which the casters 31–36 rest. The laminator 12 and the trimmer 13 are similarly sized. The first and second elongated members 26 and 27 measure about 15 feet long and they are spaced apart by about 31 inches. The first and second elongated members 26 and 27, and the brace members 28, 29, and 30 are steel members measuring about 4 inches wide and 3 inches high. The casters 31–36 support the first and second elongated members about 6 inches above the floor or other horizontal surface on which the casters rest. FIG. 3 illustrates a plate 40 bolted to the first elongated member 26 and the brace member 30 to connect those components together. FIG. 4 illustrates a plate 41 bolted to the first elongated member 26 and a leg portion 42 of the laminator 12 to connect those components together. Three other legs on the laminator 12 and four legs on the trimmer 13 are connected in a similar manner. Of course, the exact dimensions and particulars of construction may vary within the scope of the claims and without departing from the inventive concepts disclosed. Based upon the foregoing, one of ordinary skill in the art can readily construct a laminating system with a movable support structure that functions as described.

Next, consider the motor speed control components of the laminating system 10. The feeder 11 includes a first motor 45 (a feeder motor in FIG. 8) that is adapted to power movement of the individual sheets (e.g., the individual sheets 15–18) to the laminator 12. The laminator 12 includes a second motor 46 (a laminator motor) that is adapted to power movement of the individual sheets through the laminator 12. The motor speed control components control the speed of the motors 45 and 46 in a way that enables the user to control the spacing between the individual sheets as they enter the laminator 12 by manipulating various controls on a feeder control panel 11A shown in FIGS. 1 and 7, and a laminator control panel 12A shown in FIGS. 1 and 6.

Figure 2:
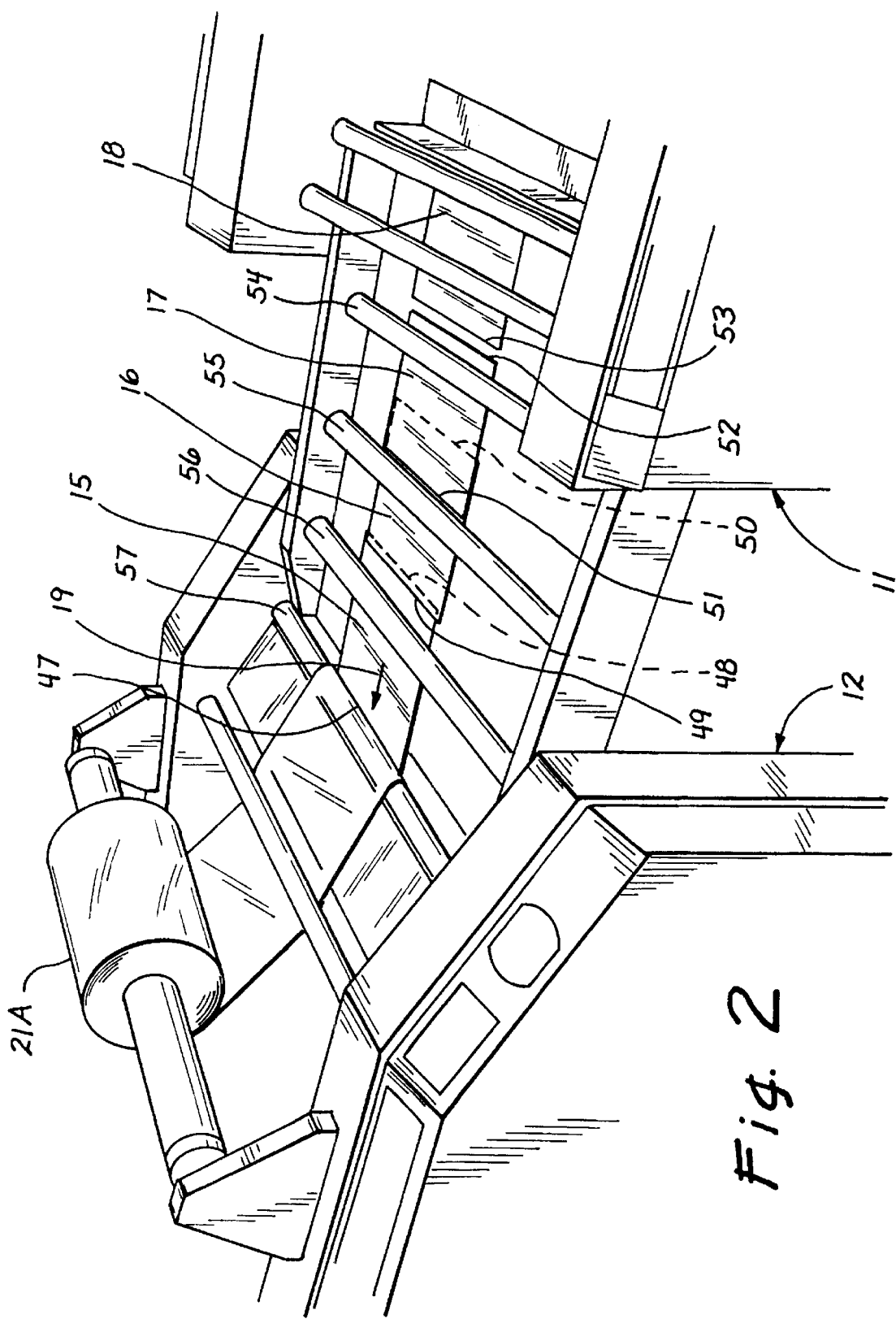
FIG. 2 is an enlarged isometric view of a portion of the laminating system showing feeding of sheets from the feeder to the laminator.

As shown in FIG. 2, the sheet 15 has a forwardly disposed leading edge 47 and a rearwardly disposed trailing edge 48. The leading edge 47 of the sheet 15 is disposed toward the laminator 12 while the trailing edge 48 is the opposite edge of the sheet 15 that is disposed toward the feeder 11. Similarly, sheet 16 has a leading edge 49 and a trailing edge 50, the sheet 17 has a leading edge 51 and a trailing edge 52, and the sheet 18 has a leading edge 53 and a trailing edge that is not visible in FIG. 2.

The sheets 15–18 proceed along the feed path depicted by the arrow 19 in FIG. 2, from the feeder 11 past first, second, and third feeder output roller assemblies 54, 55, and 56 to a laminator input roller assembly 57. The output roller assemblies 54–56 are mechanically coupled to each other and to the first motor 45 via feeder roller assembly 58 and a vacuum sheet feeder assembly 59 as depicted by dashed lines at reference numerals 60 and 61 in FIG. 8. That is done so that they all operate at a speed determined by the first motor 45. The laminator input roller assembly 57 is coupled to the second motor 46 so that its speed is determined by the second motor 46.

The sheets 15–18 may overlap or be spaced apart as they proceed along the feed path. FIG. 2 depicts various degrees of overlap for illustrative purposes, although the amount of overlap is uniform under normal operating conditions. With the speed of the laminator motor (i.e., the second motor 46 in FIG. 8) set by the user to be greater than the speed of the feeder motor (i.e., the first motor 45 in FIG. 8), the sheet 15 increases in speed when the leading edge 47 of sheet 15 is engaged by the laminator input roller assembly 57 and the trailing edge 48 is released by the third feeder output roller assembly 56. This increase in speed results in a space developing between the trailing edge 48 of the sheet 15 and the leading edge 49 of the sheet 16. Spaces are introduced between other sheets in the same way, a space between the trailing edge of one sheet and the leading edge of the following sheet.

The motor speed control components of the laminating system 10 enable the user to precisely set motor speed, and thereby the spacing. They include simultaneous speed control means for enabling the user to simultaneously vary the speed of the first motor 45 and the speed of the second motor 46 by the operation of a simultaneous speed control operator input device. And they include differential speed control means for enabling the operator to control the difference between the speed of the first motor 45 and the speed of the second motor 46 by the operation of a differential speed control operator input device. While operating at a slow motor speed, the user adjusts the differential speed control means to achieve desired spacing. The user then simultaneously increases motor speed with the simultaneous speed control means to a desired higher level for a production run.

Figure 8:
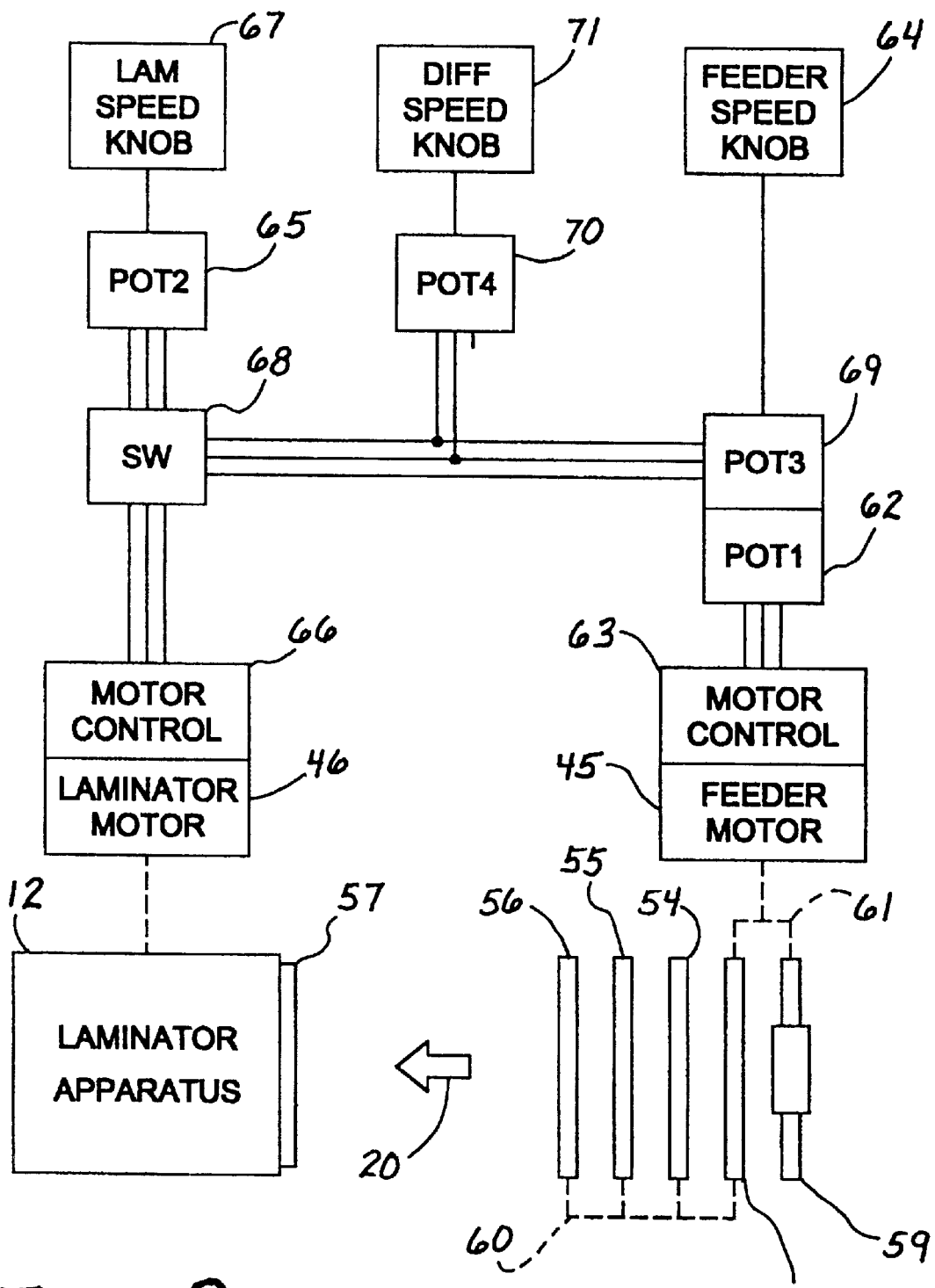
FIG. 8 is a diagrammatic representation of the speed control components of the feeder and the laminator that adjust sheet spacing.

A first potentiometer 62 (POT1) and first motor control circuit 63 (FIG. 8) utilize known motor speed control techniques and components to enable the user to control the speed of the first motor 45 by operation of a first knob 64 (a feeder speed knob) identified in FIGS. 7 and 8. A second potentiometer 65 (POT2) and a second motor control circuit 66 utilize known motor speed control techniques and components to enable the user to control the speed of the second motor 46 by operation of a second knob 67 (a laminator speed knob) identified in FIGS. 6 and 8. A switch 68 (FIGS. 6 and 8) is provided for enabling the user to selectively switch the second motor control circuit 65 between the second potentiometer 65 (POT2) and a third potentiometer 69 (POT3) that is physically ganged to the first potentiometer 62 (POT1).

With the switch 68 switched to the third potentiometer 69 (POT3), operation of the knob 64 (a simultaneous speed control operator input device) simultaneously operates both the first potentiometer 62 (POT1) and the third potentiometer 67 (POT3) to thereby enable the user to simultaneously vary the speed of the first motor 45 and the speed of the second motor 46. With the switch 68 switch to the second potentiometer 65 (POT2), operation of the first knob 64 controls the speed of the first motor 45, and operation of the second knob 67 controls the speed of the second motor 46. A variable resistor in the form of a fourth potentiometer 70 connected to a third knob 71 (a differential speed control operator input device identified in FIGS. 7 and 8) is also provided. It is suitably connected to the third potentiometer 69 (POT3) according to known techniques to enable the user to increase the speed of the second motor 46 relative to the first motor 45 by operation of the third knob 71 when the switch 68 is switched to the third potentiometer 69 (POT3).

In terms of the methodology, a method of controlling the spacing between sheets during the process of laminating the sheets with an automated laminating system includes the step of providing (i) a feeder adapted to hold a stack of the sheets and to feed individual sheets from the stack of sheets along a feed path at a feeder speed; (ii) a laminator adapted to receive the individual sheets from the feeder apparatus and to laminate the individual sheets with a continuous length of laminating film to form a continuous length of laminated sheets at a laminator speed; (iii) a simultaneous speed control operator input device, the operation of which simultaneously varies the magnitude of the feeder speed and the magnitude of the laminator speed; and (iv) a differential speed control operator input device, the operation of which varies the difference between the magnitude of the feeder speed and the magnitude of the laminator speed. The method proceeds by varying the magnitude of the feeder speed and the magnitude of the laminator speed simultaneously by the operation of the simultaneous speed control operator input device, and varying the difference between the magnitude of the feeder and the magnitude of the laminator speed by the operation of the differential speed control operator input device in order to thereby control the spacing between individual sheets as the sheets are received by the laminator. Based upon the foregoing description, one of ordinary skill in the art can readily employ other simultaneous and differential motor speed control techniques and components in a laminating system to achieve desired sheet spacing, all within the scope of the claims and without departing from the inventive concepts disclosed.

Figure 9:
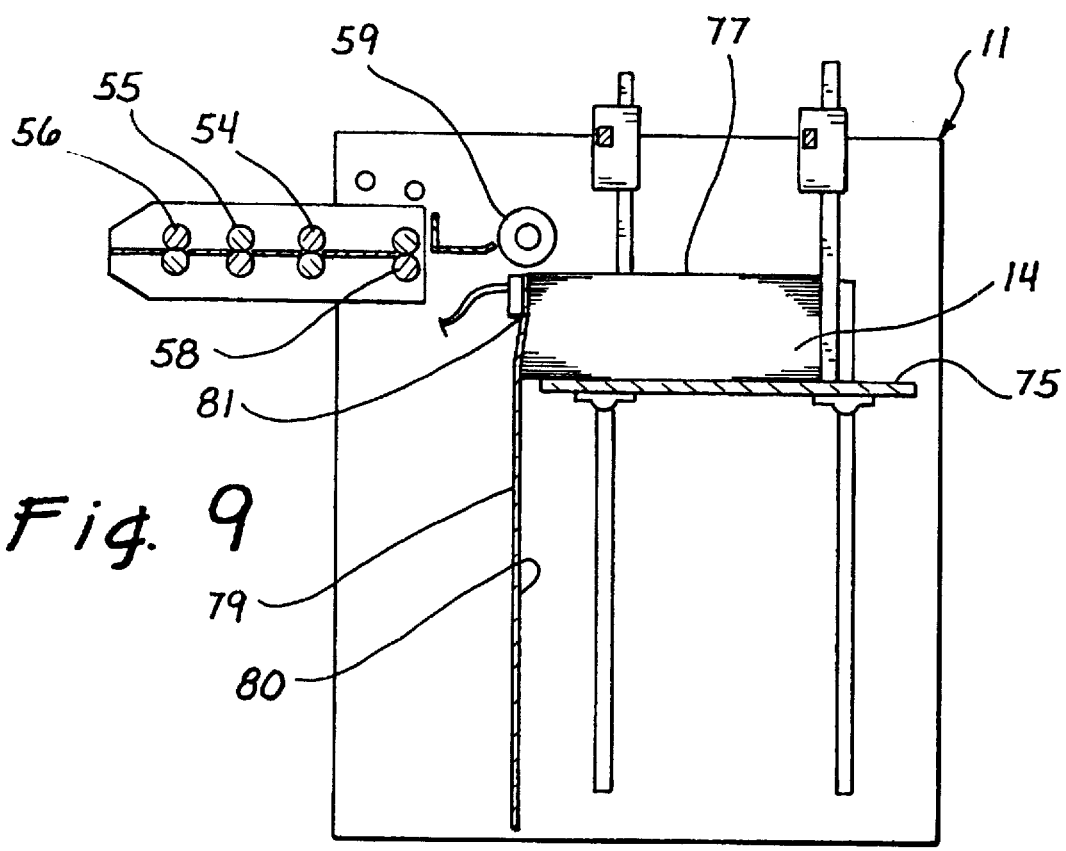
FIG. 9 is an elevation view of the feeder interior showing uppermost sheets in a stack of sheets bearing against the protruding upper portion of a guide plate as the stack of sheets is raised by a movable tray.
Figure 10:
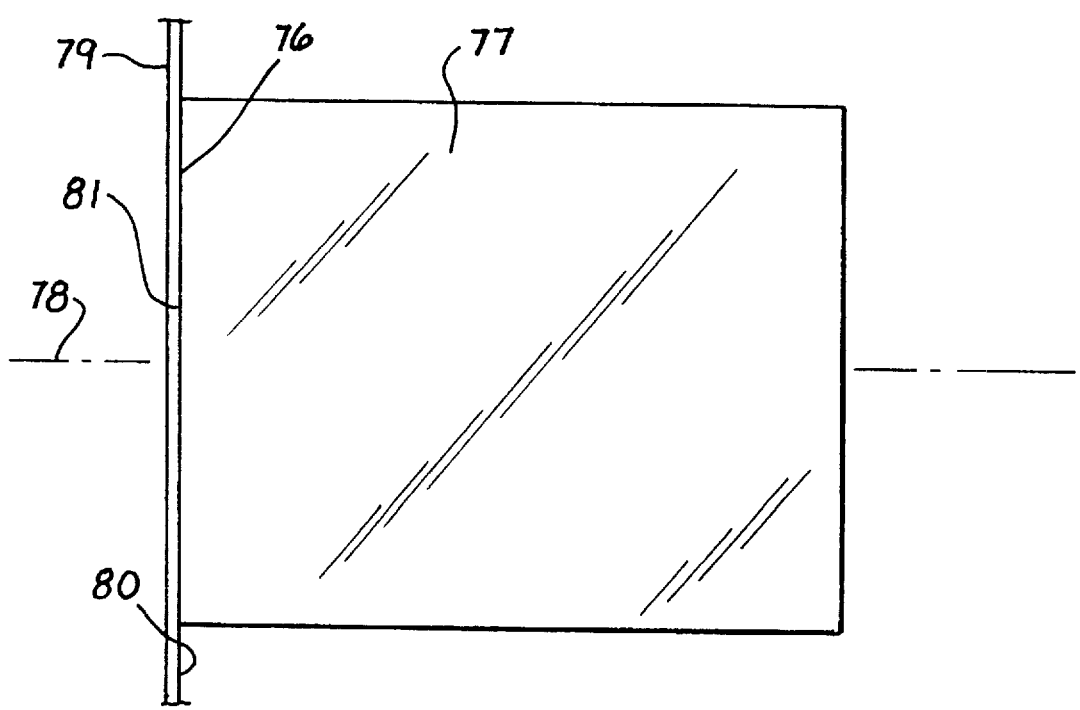
FIG. 10 is a diagrammatic representation looking downwardly at the uppermost sheet in the stack of sheets to show its relationship with the upper portion of the guide plate.

Turning now to FIGS. 9 and 10, they show various additional details of the feeder 11 that help square the leading edges of sheets with the laminator 12. The feeder 11 includes a vertically movable table or tray 75 upon which the stack of sheets 14 rests. The tray 75 is adapted to support the stack of sheets 14 so that a leading edge of each sheet in the stack of sheets is disposed toward the laminator 12. This is illustrated in FIG. 10 by a leading edge 76 of an uppermost sheet 77 in the stack of sheets 14 being disposed toward the viewer's left (toward the laminator 12). The tray 75 is also is adapted to automatically raise the stack of sheets 14 as the motor-driven vacuum sheet feeder assembly 59 feeds individual sheets along the feed path depicted by an arrow 19 in FIG. 2 and an arrow 20 in FIG. 8. The vacuum sheet feeder assembly 59 is adapted to lift individual sheets one at a time from the stack of sheets 14 and to feed the individual sheets one at a time to the feed path (along a longitudinal axis 78 identified in FIG. 10 that is aligned with the feed path) and through the feed roller assembly 58 and the first, second, and third feeder output roller assemblies 54, 55, and 56 identified in FIG. 9 to the laminator input roller assembly 57 in FIGS. 2 and 8.

The feeder 11 includes a guide plate 79 (e.g., ⅛ inch thick metal plate) disposed alongside the leading edges of the sheets in the stack of sheets 14. The guide plate 79 helps keep the uppermost sheets in the stack of sheets 14 square with the laminator 12 (i.e., it helps keep the leading edges perpendicular to the longitudinal axis 78 and thereby the feed path). For this purpose, the guide plate 79 has an upwardly extending surface 80 that faces the leading edges of the sheets in the stack of sheets 14. The upwardly extending surface 80 of the guide plate 79 extends horizontally perpendicular to the feed path, and it includes an upper portion 81 (FIGS. 9 and 10) that protrudes slightly toward the stack of sheets 14. As the stack of sheets 14 is raised by the tray 75, the leading edges of uppermost sheets in the stack of sheets (e.g., the leading edge 76 of the uppermost sheet 77 in FIG. 10) bear against the upper portion 81 of the guide plate 79 and this helps position the leading edges of the uppermost sheets perpendicular to the feed path so that they enter the laminator 12 squarely.

Thus, the invention provides a laminating system that significantly facilitates automated lamination. The components are kept aligned so that an inadvertent bump or push and relocation of system components to another shop location or storage location does not upset alignment. The user's ability to maintaining desired spacing between laminated sheets is improved, and the leading edges of individual sheets are kept square with the feed path, the laminator, and the trimmer. Although an exemplary embodiment has been shown and described, one of ordinary skill in the art may make many changes, modifications, and substitutions without necessarily departing from the spirit and scope of the invention.

What is claimed is:

1. A laminating system, comprising:

a feeder apparatus, a laminating apparatus, and a trimmer apparatus that are adapted to operate cooperatively to laminate sheets; and a movable support structure upon which the feeder apparatus, the laminating apparatus, and the trimmer apparatus are mounted;

the feeder apparatus being adapted to hold a stack of sheets and to feed individual sheets from the stack of sheets to the laminating apparatus;

the laminating apparatus being adapted to receive the individual sheets from the feeder apparatus, to laminate the individual sheets with a continuous length of laminating film to form a continuous length of laminated sheets, and to feed the continuous length of laminated sheets to the trimmer apparatus;

the trimmer apparatus being adapted to receive the continuous length of laminated sheets from the laminating apparatus and to trim the continuous length of laminated sheets; and the movable support structure being adapted to retain the feeder apparatus, the laminating apparatus, and the trimmer apparatus in alignment with each other for cooperative operation as a laminating system while enabling a user to move the support structure, the sheet feeder apparatus, the laminating apparatus, and the trimmer apparatus together without upsetting the alignment;

wherein the feeder apparatus is so mounted on the movable support structure as to enable movement of the feeder apparatus toward and away from the laminating apparatus.

2. A laminating system, comprising:

a feeder apparatus, a laminating apparatus, and a trimmer apparatus that are adapted to operate cooperatively to laminate sheets; and a movable support structure upon which the feeder apparatus, the laminating apparatus, and the trimmer apparatus are mounted;

the feeder apparatus being adapted to hold a stack of sheets and to feed individual sheets from the stack of sheets to the laminating apparatus;

the laminating apparatus being adapted to receive the individual sheets from the feeder apparatus, to laminate the individual sheets with a continuous length of laminating film to form a continuous length of laminated sheets, and to feed the continuous length of laminated sheets to the trimmer apparatus;

the trimmer apparatus being adapted to receive the continuous length of laminated sheets from the laminating apparatus and to trim the continuous length of laminated sheets; and the movable support structure being adapted to retain the feeder apparatus, the laminating apparatus, and the trimmer apparatus in alignment with each other for cooperative operation as a laminating system while enabling a user to move the support structure, the sheet feeder apparatus, the laminating apparatus, and the trimmer apparatus together without upsetting the alignment;

wherein the laminating system includes:

first and second elongated members on the support structure upon which the feeder apparatus, the laminating apparatus, and the trimmer apparatus are mounted, the first and second elongated members extending horizontally in parallel relationship to each other;

a plurality of brace members on the support structure that extend horizontally between the first and second elongated members in order to maintain the first and second elongated members in fixed parallel relationship to each other;

a plurality of casters on the support structure that support the first and second elongated support members in order to enable movement of the entire laminating system as a unit without upsetting alignment of the feeder apparatus, the laminating apparatus, and the trimmer apparatus; and a plurality of wheel assemblies on the feeder apparatus that ride within channels in the first and second elongated members to enable a user to move the feeder apparatus toward and away from the laminating apparatus.

3. A laminating system, comprising:

a feeder apparatus, a laminating apparatus, and a trimmer apparatus that are adapted to operate cooperatively to laminate sheets; and a movable support structure upon which the feeder apparatus, the laminating apparatus, and the trimmer apparatus are mounted;

the feeder apparatus being adapted to hold a stack of sheets and to feed individual sheets from the stack of sheets to the laminating apparatus;

the laminating apparatus being adapted to receive the individual sheets from the feeder apparatus, to laminate the individual sheets with a continuous length of laminating film to form a continuous length of laminated sheets, and to feed the continuous length of laminated sheets to the trimmer apparatus;

the trimmer apparatus being adapted to receive the continuous length of laminated sheets from the laminating apparatus and to trim the continuous length of laminated sheets; and the movable support structure being adapted to retain the feeder apparatus, the laminating apparatus, and the trimmer apparatus in alignment with each other for cooperative operation as a laminating system while enabling a user to move the support structure, the sheet feeder apparatus, the laminating apparatus, and the trimmer apparatus together without upsetting the alignment;

said laminating system further comprising:

simultaneous speed control means for enabling a user to simultaneously vary a feeder apparatus speed at which the feeder apparatus feeds the individual sheets and a laminating apparatus speed at which the laminating apparatus laminates the individual sheets by the operation of a simultaneous speed control operator input device; and differential speed control means for enabling the operator to control the difference between the feeder apparatus speed and the laminating apparatus speed by the operation of a differential speed control operator input device in order to thereby control the spacing between individual sheets as the sheets are received by the laminating apparatus.

4. A laminating system, comprising:

a feeder apparatus, a laminating apparatus, and a trimmer apparatus that are adapted to operate cooperatively to laminate sheets; and a movable support structure upon which the feeder apparatus, the laminating apparatus, and the trimmer apparatus are mounted;

the feeder apparatus being adapted to hold a stack of sheets and to feed individual sheets from the stack of sheets to the laminating apparatus, and the feeder apparatus having a first motor adapted to power movement of the individual sheets to the laminating apparatus;

the laminating apparatus being adapted to receive the individual sheets from the feeder apparatus, to laminate the individual sheets with a continuous length of laminating film to form a continuous length of laminated sheets, and to feed the continuous length of laminated sheets to the trimmer apparatus, and the laminating apparatus having a second motor adapted to power movement of the individual sheets through the laminating apparatus;

simultaneous speed control means for enabling a user to simultaneously vary the speed of the first motor and the speed of the second motor by the operation of a simultaneous speed control operator input device; and differential speed control means for enabling the operator to control the difference between the speed of the first motor and the speed of the second motor by the operation of a differential speed control operator input device in order to thereby control the spacing between individual sheets as the sheets are received by the laminating apparatus.

5. A laminating system as recited in claim 4, wherein:

the feeder apparatus includes a first motor control circuit, a first potentiometer that is connected to the first motor control circuit and adapted to enable a user to vary the speed of the first motor, and a simultaneous speed control operator input device in the form of a first knob connected operatively to the first potentiometer;

the laminating apparatus includes a second motor control circuit, a second potentiometer that is connected to the second motor control circuit and adapted to enable the user to vary the speed of the second motor, and a laminating apparatus speed control operator input device in the form of a second knob connected operatively to the second potentiometer;

the feeder apparatus also includes a third potentiometer connected physically to the first potentiometer for simultaneous operation with the first potentiometer; and the laminating system includes switching means for enabling the user to switch the second motor control circuit from the second potentiometer to the third potentiometer in order to selectively switch to simultaneous speed control operation enabling the user to control the speed of the first motor and the speed of the second motor simultaneously by turning the first knob.

6. A laminating system as recited in claim 5, wherein the differential speed control means includes a variable resistance connected electrically to the third potentiometer in order to enable the user to vary the speed of the second motor relative to the first motor.

7. A laminating system, comprising:

a feeder apparatus, a laminating apparatus, and a trimmer apparatus that are adapted to operate cooperatively to laminate sheets; and a movable support structure upon which the feeder apparatus, the laminating apparatus, and the trimmer apparatus are mounted;

the movable support structure being adapted to retain the feeder apparatus, the laminating apparatus, and the trimmer apparatus in alignment with each other for cooperative operation as a laminating system while enabling a user to move the support structure, the sheet feeder apparatus, the laminating apparatus, and the trimmer apparatus together without upsetting the alignment;

said laminating system further comprising:

simultaneous speed control means for enabling a user to simultaneously vary a feeder apparatus speed at which the feeder apparatus operates and a laminating apparatus speed at which the laminating apparatus operates by the operation of a simultaneous speed control operator input device; and differential speed control means for enabling the operator to control the difference between the feeder apparatus speed the laminating apparatus speed by the operation of a differential speed operator input device in order to thereby control the spacing between individual sheets as the sheets are received by the laminating apparatus.

* * * * *